United States Patent [19]
Walenty et al.

[11] Patent Number: 4,835,695
[45] Date of Patent: May 30, 1989

[54] ADD-ON VEHICLE WHEEL SLIP CONTROLLER

[75] Inventors: Allen J. Walenty, Utica; Kevin G. Leppek, West Bloomfield, both of Mich.

[73] Assignee: General Motors Corporation, Detroit, Mich.

[21] Appl. No.: 120,597

[22] Filed: Nov. 13, 1987

[51] Int. Cl.$^4$ ............................................... B60T 8/58
[52] U.S. Cl. ........................... 364/426.02; 364/426.01; 303/100; 303/110; 303/115; 180/197
[58] Field of Search ................. 303/100, 96, 115, 110; 364/426, 426.01, 426.02; 180/197

[56] References Cited

U.S. PATENT DOCUMENTS

| | | | |
|---|---|---|---|
| 3,420,580 | 1/1969 | Dymond | 303/116 |
| 3,549,210 | 12/1970 | Birge et al. | 303/115 |
| 4,046,214 | 9/1977 | Adahan | 303/119 X |
| 4,511,971 | 4/1985 | Dittner et al. | 364/426 |
| 4,571,010 | 2/1986 | Dittner et al. | 303/110 |
| 4,627,670 | 12/1986 | Matsuda et al. | 303/115 |
| 4,664,453 | 5/1987 | Kade et al. | 303/104 X |
| 4,756,391 | 7/1988 | Agarwal et al. | 303/100 X |

FOREIGN PATENT DOCUMENTS 2020764 11/1979 United Kingdom .

Primary Examiner—Eugene R. Laroche
Assistant Examiner—Seung Ham
Attorney, Agent, or Firm—Howard N. Conkey

[57] ABSTRACT

Vehicle wheel slip is controlled by an add-on brake pressure modulator that may function in addition to limit the brake pressure applied to the vehicle wheels during anti-lock braking. A piston is moved in a cylinder to regulate the braking pressure. During non-operating conditions of the modulator the piston is moved to provide minimum cylinder volume to be in condition to be moved to withdraw fluid from the brake system to limit brake pressure. When a potential for excessive slip of a driven wheel is detected, the piston is moved to increase the volume of the cylinder to draw in braking fluid from a reservoir. The modulator is then in condition to apply regulated brake pressure to limit excessive slip. When the potential for excessive slip no longer exists, the piston is controlled to provide minimum volume while returning the brake fluid to the reservoir. The modulator is then again in condition for limiting brake pressure.

5 Claims, 6 Drawing Sheets

ADD-ON VEHICLE WHEEL SLIP CONTROLLER

This invention relates to a wheel slip control system for a motor vehicle and more particularly to a wheel slip control system that utilizes a motor driven brake pressure modulator that functions additionally to limit the brake pressure to prevent the wheels from locking during brake application.

U.S. Pat. No. 4,664,453 assigned to the assignee of this invention describes an anti-lock brake control system that utilizes a motor driven pressure modulator for actuating the brakes of the vehicle. This modulator takes the form of a DC motor driven piston which is controlled to modulate the pressure at the vehicle brakes. The modulator is described in this patent in a brake-by-wire system. However, the modulator may take the form of an add-on pressure modulator utilized only during anti-lock brake control for limiting brake pressure applied to the vehicle in order to prevent a lock-up condition.

When utilized as an add-on pressure controller, during normal braking conditions the piston must be positioned at an extended position so as to be able to be retracted in the event an incipient wheel lockup condition is detected to withdraw fluid from the corresponding vehicle brake cylinder to reduce the pressure to prevent the wheel from locking up. Upon termination of wheel lock controlled braking, the piston must then be driven to the extended position so as to be available and ready to again withdraw fluid from the brake system in the event a detected incipient wheel lockup condition is detected.

If the same modulator is to be used to apply braking pressure to the brakes of a driven wheel having excessive slip during vehicle acceleration, it can be seen that the modulator is incapable of applying brake pressure when the piston is in the fully extended position.

The subject invention provides for the control of wheel slip during vehicle acceleration by utilizing an add-on brake pressure modulator that functions in addition to limit the brake pressure applied to the vehicle wheels during anti-lock braking. In accord with this invention, a motor driven modulator comprising a piston movable in a cylinder for varying the volume of the cylinder to regulate the braking pressure is positioned during non-operating conditions of the modulator so as to provide minimum cylinder volume. In this position the modulator is in a condition where the piston may be moved to increase the cylinder volume to withdraw fluid from the brake system to reduce the pressure in the event an incipient wheel lockup condition is detected during wheel braking.

As previously indicated, when the piston is in the position providing minimum cylinder volume and therefore in condition for limiting brake pressure during anti-lock controlled braking, the modulator is not capable of applying braking pressure to limit slip of a driven wheel. In accord with this invention, when a potential for excessive slip of a driven wheel is detected, the piston of the corresponding modulator is moved to increase the volume of the cylinder to draw in braking fluid from a reservoir. The modulator is then in condition to apply regulated brake pressure to the brakes of the driven wheel to limit slip during vehicle acceleration. When the potential for excessive slip of the driven wheel no longer exists, the piston is controlled to provide minimum volume of the cylinder while returning the brake fluid to the reservoir. The modulator is then again in condition for limiting brake pressure during anti-lock controlled braking.

The invention may be best understood by reference to the following description of a preferred embodiment of the invention and the drawings in which.

Figure 1:
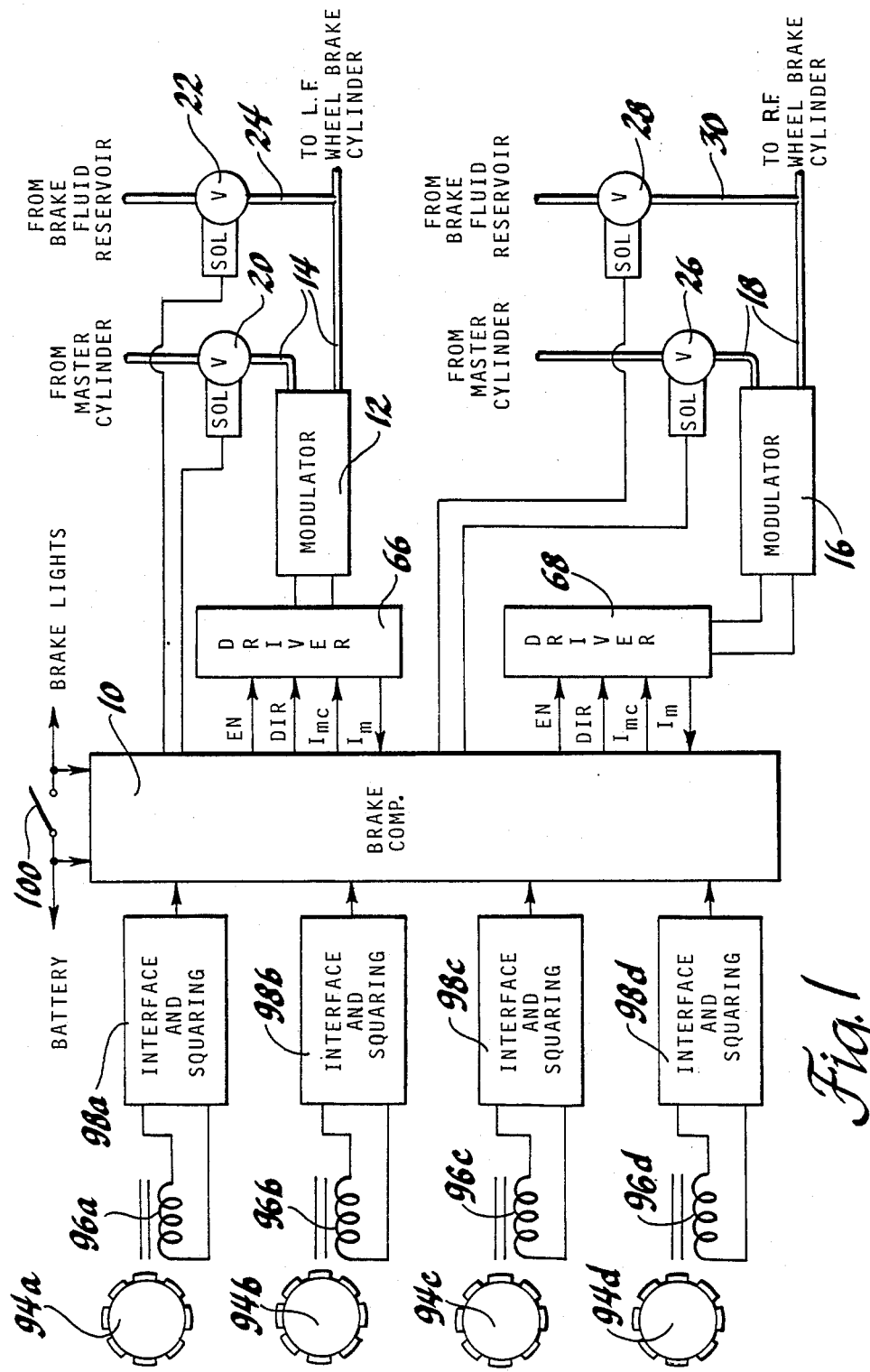
FIG. 1 is a diagram illustrating a braking system for controlling the brakes of the driven wheels of a vehicle for anti-lock brake control and for acceleration slip control in accord with the principles of this invention.

The add-on vehicle wheel slip controller of this invention is described with respect to a front wheel drive automotive vehicle. In general, a brake computer 10 is responsive to the front and rear wheel speeds of the vehicle for limiting the brake pressure applied to the respective wheel brakes during braking so as to prevent wheel lockup and for applying brake pressure to the brakes of a spinning driven wheel during vehicle acceleration to limit wheel slip so as to improve the tractive and lateral forces during vehicle acceleration.

The foregoing is accomplished by controlling an add-on pressure modulator 12 inserted in the brake fluid line 14 between the conventional brake system master cylinder and the left front wheel brake cylinder and an add-on pressure modulator 16 inserted in the brake fluid line 18 between the brake system master cylinder and the right front wheel brake cylinder. The system may additionally include a pressure modulator for limiting the pressure applied to the undriven rear wheel brakes during braking so as to prevent a wheel lockup condition in those wheels. However, the control of that modulator forms no part of this invention since only the pressure to the brakes of the driven wheels are controlled in accord with this invention to limit acceleration wheel slip.

A normally open solenoid valve 20 is provided in the brake line 14 between the master cylinder and the modulator 12 and a normally closed solenoid valve 22 is provided in a brake fluid line 24 connecting the brake system fluid reservoir to the brake line 14 at the output side of the modulator 12. Similarly, a normally open solenoid valve 26 is provided in the brake line 18 between the master cylinder and the modulator 16 and a normally closed solenoid valve 28 is provided in a brake fluid line 30 connecting the brake system fluid reservoir to the brake line 18 at the output side of the modulator 16.

The add-on pressure modulators 12 and 16 are identical and take the form of a torque motor driven modulator as illustrated in FIGS. 3A and 3B. For illustration, the fluid couplings are illustrative of the modulator 12. The modulator includes a DC torque motor 32 whose output shaft drives an input gear 34 which in turn drives intermediate gear 36 and final output gear 38.

A threaded power screw 40 is secured for rotation with the final output drive gear 38. A piston 42 includes a threaded nut portion 44 threaded onto the power screw 40 so that rotation of the power screw 40 functions to retract or extend the piston 42, depending upon the direction of rotation of the power screw 40 by the DC torque motor 32.

The modulator further includes a housing 46 in which a cylinder 48 is formed. The piston 42 is reciprocably received in the cylinder 48 and defines therewith a chamber 50 (best illustrated in FIG. 3b). Reciprocal movement of the piston 42 functions to vary the volume of the chamber 50 of the cylinder 48. A seal in the form of an 0-ring 52 prevents fluid leak past the piston 42.

The left front wheel brake cylinder is directly coupled to the chamber 50 for all positions of the piston 42 via the brake line 14 and a passageway 54 in the housing 46. The master cylinder is coupled to the chamber 50 via the brake line 14, the normally open valve 20 and a check valve 56. The check valve 56 includes a valve seat 58 defining an opening into the chamber 50 and a ball 60 biased against the seat 58 by a spring 62 to close off the fluid flow from the master cylinder to the chamber 50.

The piston 42 includes a small projection 64 that functions to unseat the ball 60 from the valve seat 58 when the piston 42 is positioned by the power screw 40 to the fully extended position illustrated in FIG. 3A to couple the master cylinder to the wheel brake cylinder through the normally open valve 20. In this state, the braking system provides for normal manual braking of the wheel via the master cylinder.

The overall efficiency of the elements including the power screw 40, the nut 44 and the gears 34-38 is such that the torque motor 32 is not back driven by the maximum pressure that will be present in the chamber 50 and operating against the face of the piston 42. This provides that the torque motor 32 may be deenergized at any position of the piston 42 which will not be varied by pressure in the chamber 50. Alternatively, a high efficiency screw may be provided in conjunction with a brake that may be operated to hold the piston at any desired position at which the DC motor 32 is deenergized.

The DC torque motors associated with each of the pressure modulators 12 and 16 are controlled by the brake computer 10 to modulate the brake pressure at the respective wheel cylinders via respective driver circuits 66 and 68. In general, the torque motor direction and the magnitude of the torque motor current are controlled. The direction of the motor rotation determines if the piston is being extended or retracted. Since brake pressure that is established by the modulator is a function of the output torque of the torque motor and since the torque output of the torque motor is a function of its current, the magnitude of the current through the motor is related to and is a measure of the brake pressure established by the modulator.

Figure 2:
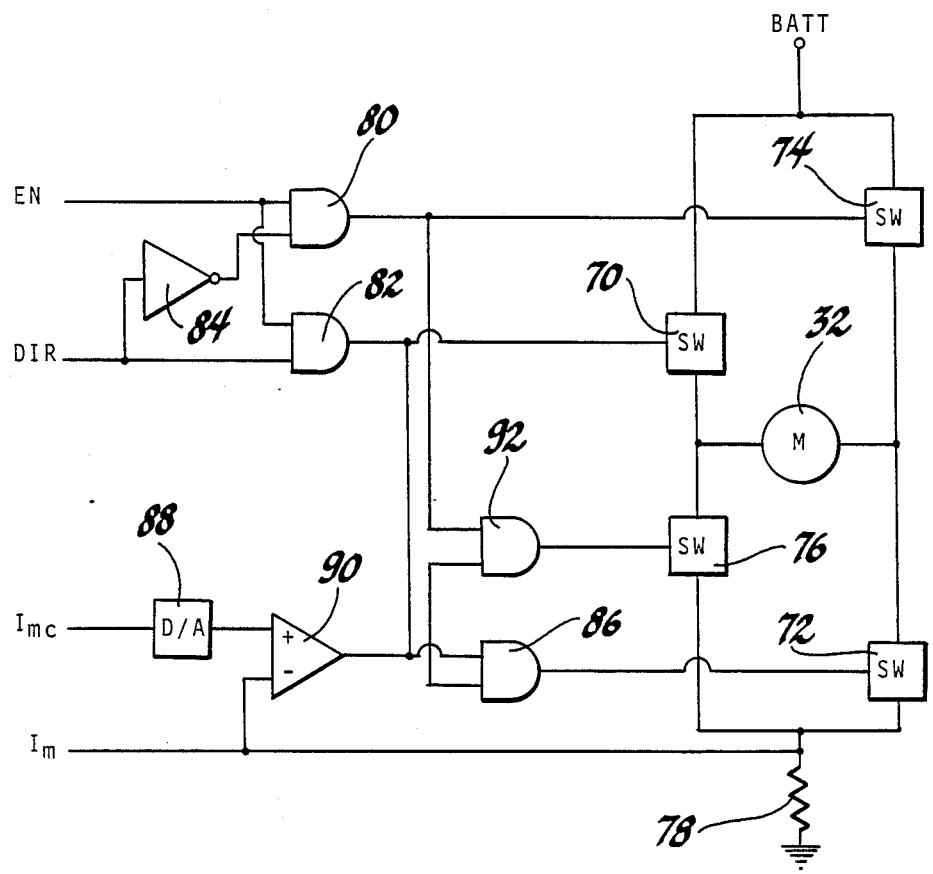
FIG. 2 is a diagram illustrating a motor driver circuit for controlling the current through the motor driven pressure modulator of FIG. 1.

As illustrated in FIG. 2, the driver circuits 66 and 68 each take the form of an H-switch comprised of solid state switching elements 70-76. The switching elements 70 and 76 are series coupled between the vehicle battery and ground through a current sensing resistor 78 with the junction between the switches being coupled to one input of the torque motor such as the torque motor 32. Similarly, the switches 72 and 74 are series coupled between the battery and ground through the sensing resistor 78 with the junction between the switches being coupled to the second input terminal of the torque motor 32.

When the switches 70 and 72 are both simultaneously biased conductive, current flows in one direction to the torque motor 32 to cause the piston 42 in the modulator to be moved in one direction. Conversely, when the switches 74 and 76 are simultaneously biased conductive, current flows through the motor 32 in the opposite direction to cause opposite movement of the piston 42. In either case, the current through the motor passes through the current sensing resistor 78, the voltage across which is representative of the magnitude of the motor current and therefore the magnitude of the pressure applied to the respective wheel brake cylinder.

To energize the motor to rotate to either extend or retract the piston 42, the brake computer 10 provides an enable signal EN to one input of each of a pair of AND gates 80 and 82. Simultaneously, the brake computer provides a signal DIR representing the desired direction of rotation of the torque motor. In this regard, a high voltage level represents a desired rotation in one direction while a low signal such as ground represents a desired rotation in the opposite direction.

The direction command signal DIR is provided to a second input of the AND gate 82 and to an input of an inverter 84 whose output is coupled to a second input of the AND gate 80. Accordingly, when the enable signal is generated, the direction signal causes either the output of the AND gate 80 or the AND gate 82 to shift to a high level depending on the high or low state of the direction signal DIR. If the direction signal is a high level, the output of the AND gate 82 shifts to a high level and is applied to the control gate of the switch 70 which is biased conductive.

The output of the AND gate 82 is also applied to one input of an AND gate 86 whose output is applied to the control gate of the switch 72. The AND gate 86 is periodically enabled by a duty cycle modulated signal so that the switch 72 is alternately biased conductive and nonconductive with a duty cycle required to establish a commanded motor current $I_{MC}$ provided by the brake computer 10. This is accomplished by means of a digital-to-analog converter 88 that receives the commanded motor current value $I_{MC}$ from the brake computer 10 and provides a corresponding analog signal value to one input of a comparator switch 90. A signal representing the actual motor current value $I_M$ from the sensing resistor 78 is applied to a second input of the comparator switch 90. The output of the comparator switch 90 shifts either to a high or low voltage depending upon the relative values of the two signals applied to its inputs. The effect is to provide a duty cycle modulated signal that establishes a measured motor current $I_M$ that is equal to the commanded motor current $I_{MC}$ represented by the output of the digital-to-analog circuit 88.

Conversely, when it is desired to rotate the motor in the opposite direction, the direction signal DIR is shifted to a low state by the brake computer to cause the AND gate 80 to shift its output to a high value. This signal is applied to the control gate of the switch 74 which is biased conductive and also to one input of an AND gate 92 whose output is applied to the control gate of the switch 76. The output of the comparator switch is also applied to a second input of the AND gate 92 so that the switch 76 is alternately biased conductive and nonconductive with a duty cycle as previously described with respect to switch 72 to establish the motor current $I_M$ to a value equal to the commanded motor current $I_{MC}$.

Returning to FIG. 1, the brake computer 10 determines the requirement for modulation of the brake pressure for either anti-lock brake control or for acceleration slip control in response to the speeds of the front and rear wheels of the vehicle. The front and rear wheel speeds of the vehicle are detected by respective wheel speed sensors including speed rings 94a through 94d each being associated with a respective one of the front and rear wheels of the vehicle. Each speed ring has teeth angularly spaced around its circumference. The teeth of the speed rings are sensed by respective electromagnetic sensors 96a through 96d as the speed rings are rotated by the respective wheels. The output of each electromagnetic sensor is a sinusoidal waveform having a frequency directly proportional to wheel speed as represented by the passing of the teeth in proximity to the electromagnetic sensor.

The sinusoidal waveforms from the electromagnetic sensors 96a through 96d are supplied to respective interface and squaring circuits 98a through 98d each of which provides a squarewave output having a frequency directly proportional to the speed of a respective wheel.

The brake computer 10 also receives power input from the vehicle battery and a signal representing operation of the vehicle brakes by means of a brake switch 100 operated upon actuation of the brake pedal by the vehicle operator. The voltage applied to the vehicle brake lights upon closure of the brake switch is sensed by the brake computer 10 as an indication of the operation of the vehicle brakes.

The brake computer 10 takes the form of a digital computer that is standard in form and includes a central processing unit (CPU) which executes an operating program permanently stored in a read-only memory (ROM) which also stores tables and constants utilized in controlling the modulators 12 and 16 for modulation of the brake pressure applied to the respective front wheel brake cylinders. The brake computer 10 also includes a random access memory (RAM) into which data may be temporarily stored and from which data may be read at various address locations determined in accord with the program stored in the ROM. The brake computer 10 further includes a clock generating a high frequency clock signal for timing and control purposes and includes input/output circuits and an analog-to-digital converter for converting signals such as the motor current $I_M$ to a digital signal to be utilized in control of the modulators 12 and 16.

The manner in which the brake computer 10 determines the respective speeds of the front and rear wheels may take any well known form. For example, the brake computer 10 may count clock pulses between each of the squarewave signal outputs of the respective interface and squaring circuits 98a and 98d to provide a measure of wheel speed. One specific manner of determining wheel speed may be to provide a free running counter which is sampled with each leading edge from a respective one of the interface and squaring circuits 98a through 98d. The difference in the count captured between consecutive leading edges represents the time between squarewave pulses which may then be utilized in standard equations to determine wheel speed. Alternatively, the I/O may include an input counter section which receives the squarewave pulse outputs of the interface and squaring circuits 98a through 98d from which wheel speed is then determined by counting clock pulses between the wheel speed pulses.

The I/O additionally includes a discrete output section controlled by the brake computer 10 for controlling the energization of the solenoid valves 20, 22, 26 and 28 in addition to the signals provided to the driver circuits 66 and 68.

Figure 3:
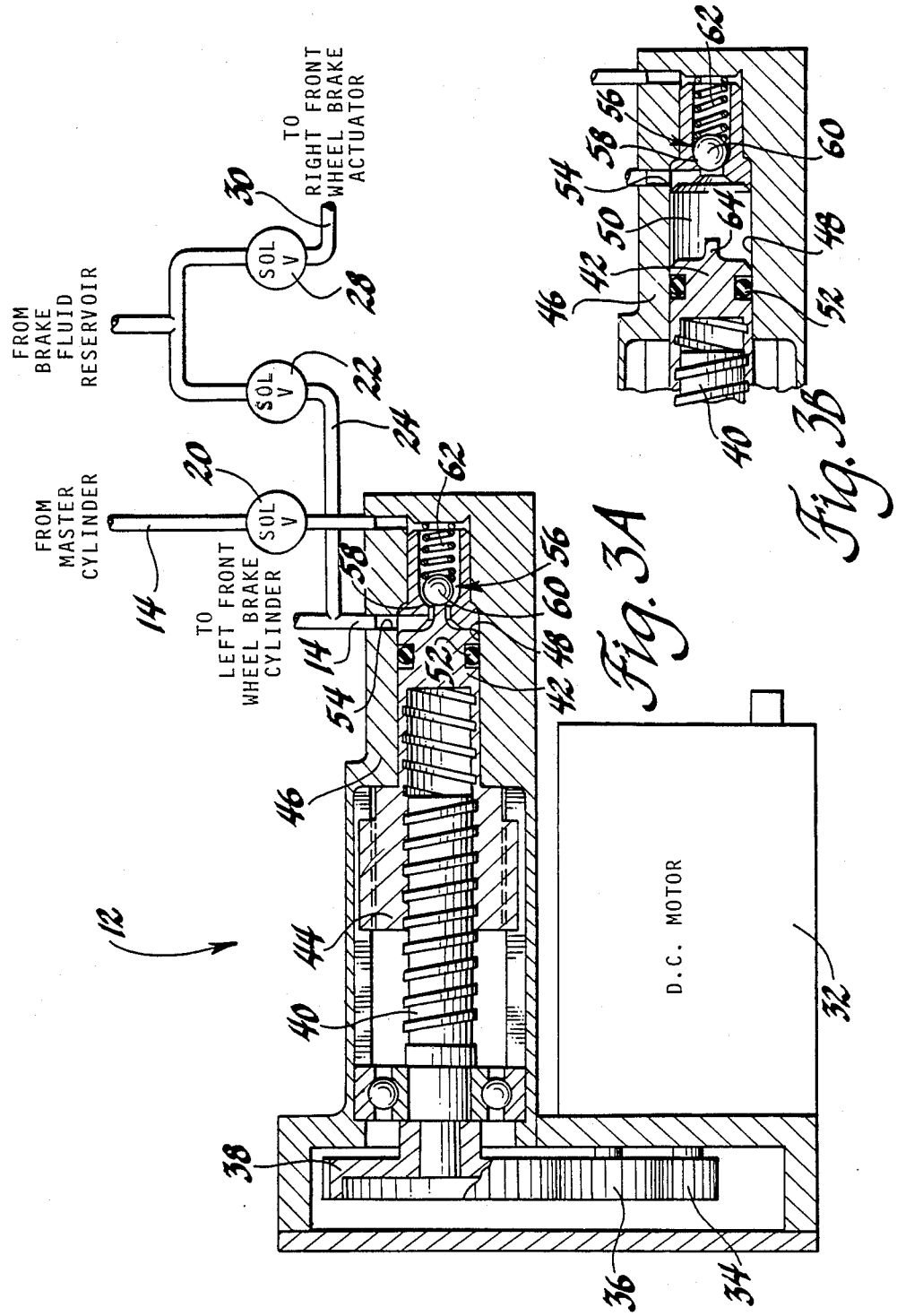
FIGS. 3A and 3B are longitudinal cross-sectional views of the motor driven pressure modulator of FIG. 1.

During vehicle operation where modulation of brake pressure is not required by the modulators 12 and 16, the piston 42 in each of the modulators is positioned in the fully extended position illustrated in FIG. 3 to open the check valve 56 to allow the brake pressure from the master cylinder to be passed through the modulator directly to the wheel brake cylinder. If the brake computer senses a requirement to limit brake pressure during vehicle braking in order to prevent a wheel lockup condition, the brake computer controls the torque motor to retract the piston which allows the check valve 56 to close to isolate the modulator from the master cylinder and to allow the volume of the chamber 50 to increase to decrease the brake pressure applied to the wheel brake cylinder. The specific manner in which the brake pressure is controlled during anti-lock braking may take the form as illustrated in the commonly assigned U.S. Pat. No. Kade et al 4,664,453. Upon completion of anti-lock braking control, the motor is controlled to again extend the piston 42 to the fully extended position to open the check valve 56 and return the brake system to normal braking operation.

In order to limit wheel slip of a driven wheel during vehicle acceleration by application of brake pressure to the slipping wheel, it can be seen that it is necessary for the piston 42 to be in a retracted position with brake fluid in the chamber 50 so that by controlling the motor to extend the piston thereby reducing the volume of the chamber 50, braking pressure may be increased at the respective wheel brake cylinder to limit slip. This is accomplished in accord with this invention by (A) energizing the electromagnetic valve 22 to open the chamber 50 to the brake fluid reservoir, (B) operating the motor in the direction for retracting the piston to draw in brake fluid from the brake fluid reservoir into the expanding chamber 50, (C) deenergizing the solenoid 22 when the chamber 50 has expanded to a predetermined volume (such as at full retraction of the piston 42) to isolate the brake fluid reservoir from the braking system and (D) energizing the solenoid valve 20 to prevent fluid from being forced through the check valve to the master cylinder.

The modulator is now in condition for applying pressure to the wheel brake cylinder to limit wheel slip. This is accomplished by controlling the motor to extend the piston 42 to increase the pressure applied to the wheel brake cylinder in a controlled manner in order to limit slip of the slipping wheel. When the potential for excessive slip of the driven wheel no longer exists, the brake computer 10 energizes the solenoid valve 22 to establish fluid communication between the chamber 50 and the brake fluid reservoir. The motor 32 is then energized so as to extend the piston 42 to pump the fluid back into the brake fluid reservoir until the piston reaches the fully extended position whereat the check valve 58 is opened. The solenoid valves 20 and 22 are then both deenergized to return the system to the normal rest position at which normal manual braking occurs and at which the modulator is in condition for limiting brake pressure during anti-lock controlled braking.

In the foregoing manner, the add-on DC motor operated brake modulator is utilized for both brake pressure limiting during anti-lock braking control and pressure application for acceleration slip control.

Figure 4:
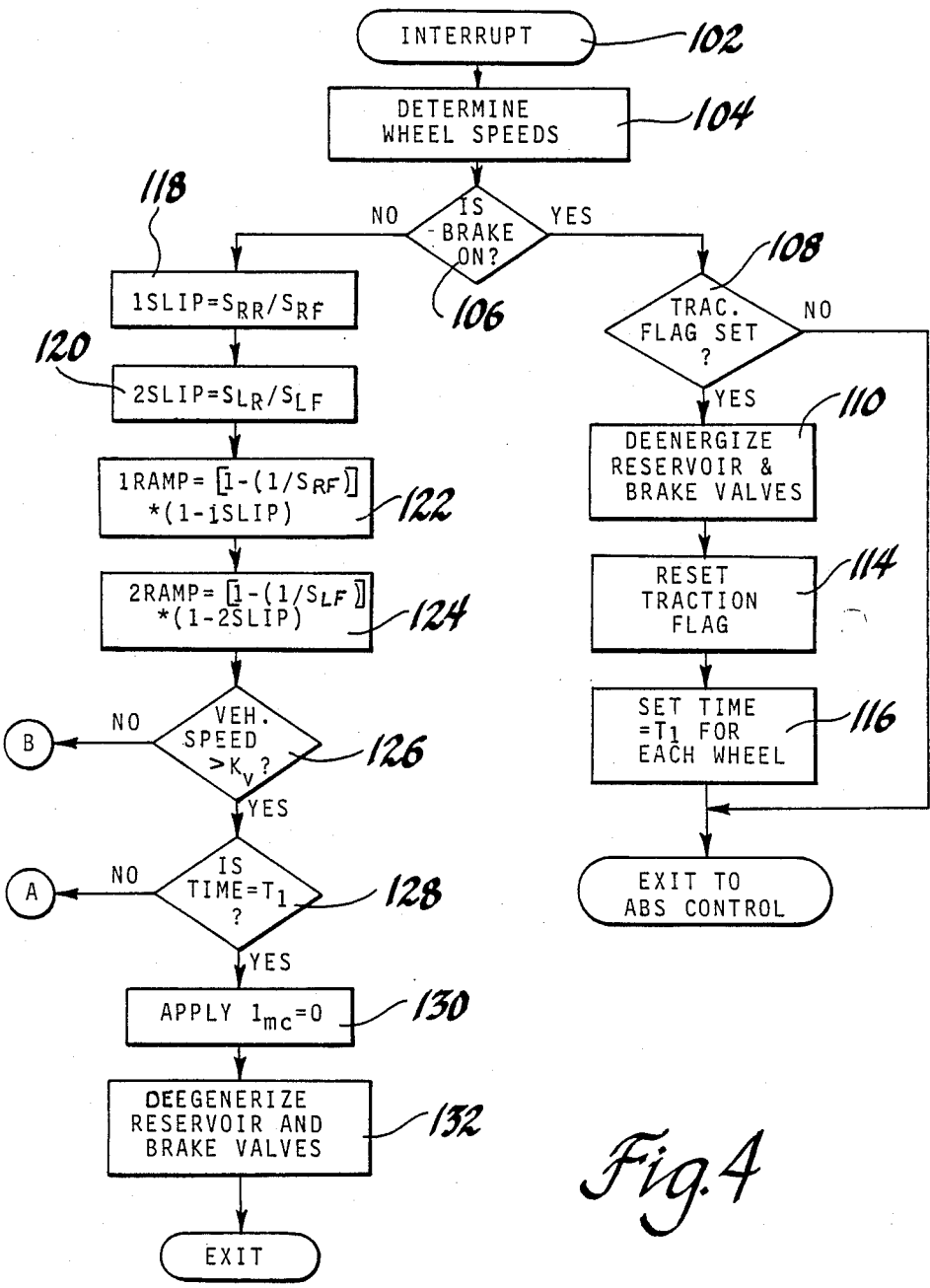
FIGS. 4, 5 and 6 are diagrams illustrating the operation of the brake computer of FIG. 1.
Figure 5:
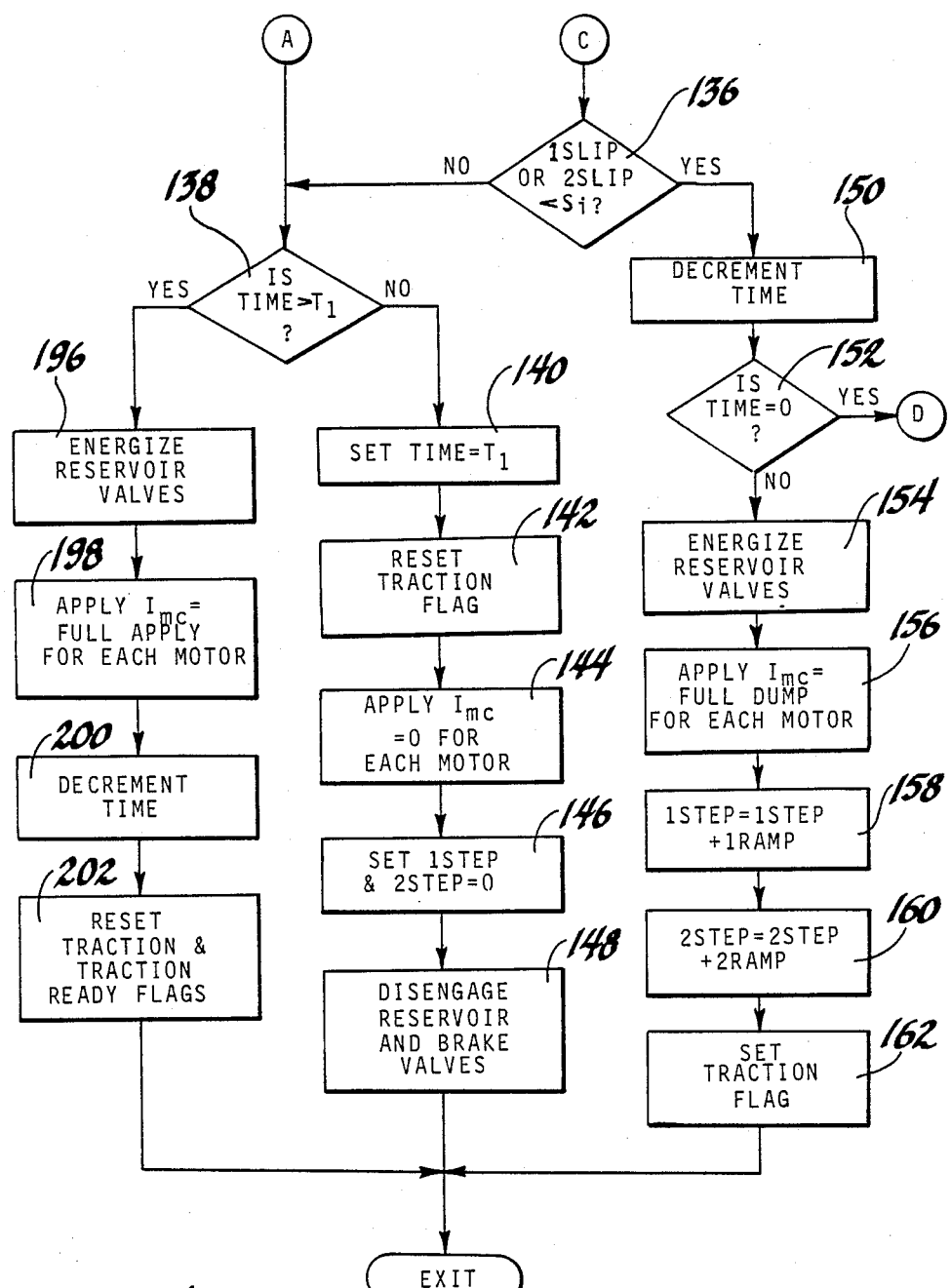
Figure 6:
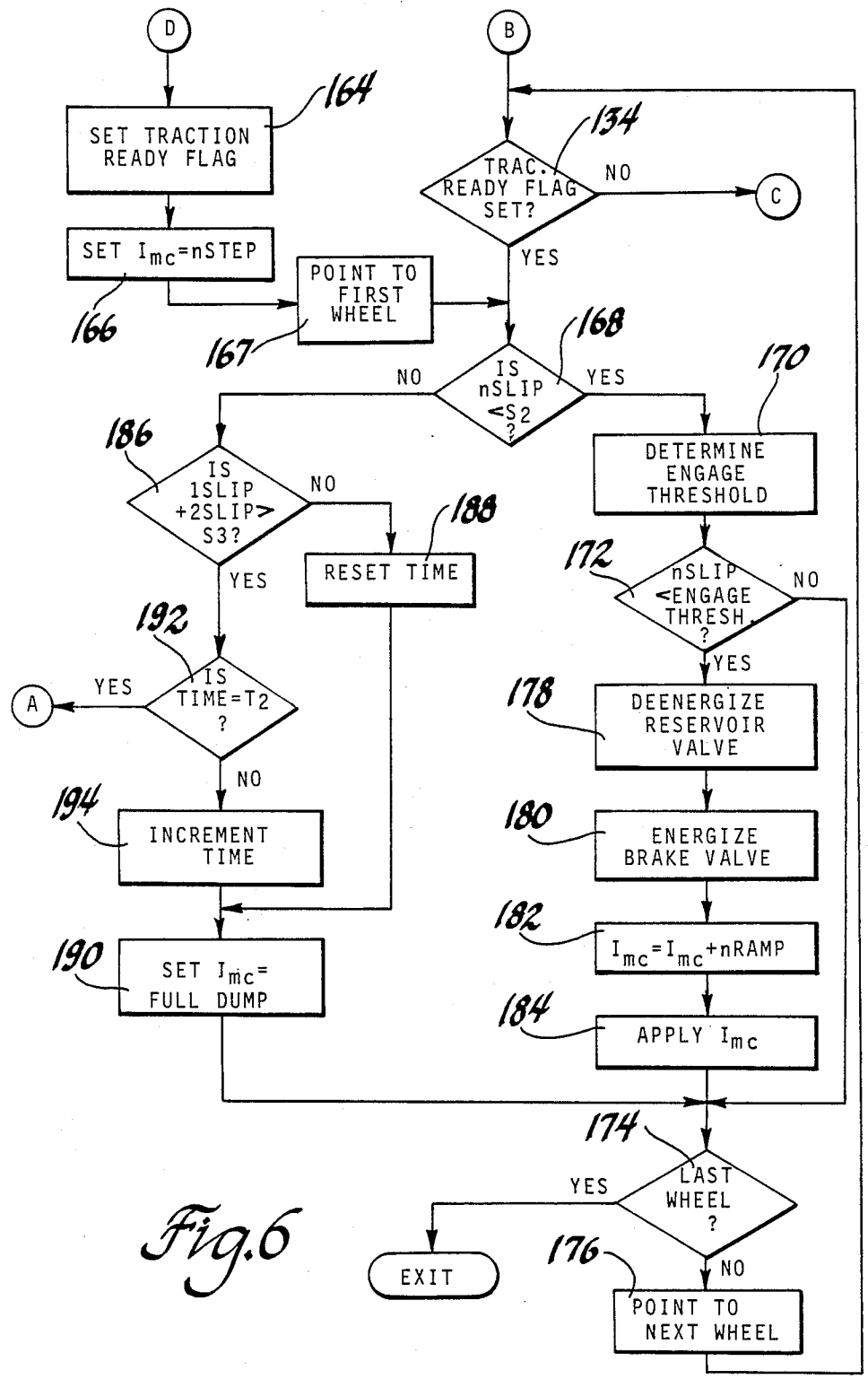

The operation of the brake computer 10 to provide wheel slip control in accord with the principles of this invention is illustrated in FIGS. 4, 5 and 6. These FIGS. illustrate an interrupt routine that is executed at each 5 millisecond interval established by the internal clock of the brake computer 10.

Referring to FIGS. 4, 5 and 6, the 5 millisecond interrupt routine for controlling the brakes of the drive wheels during vehicle acceleration in order to limit wheel slip is entered at 102 and proceeds to a step 104 where the computer determines the four wheel speeds and then to a step 106 where it determines whether the brakes have been actuated based on the operation of the switch 100 of FIG. 1. If the brakes are on, the program proceeds to a step 108 where a traction flag is sampled. If reset indicating that acceleration slip control was not previously in progress, the program exits the routine and proceeds to an anti-lock brake control routine.

Returning to step 108, if the traction flag was set indicating the program had previously initiated a wheel slip control sequence, the program proceeds to a step 110 where the solenoid valves 20, 22, 26 and 28 are all deenergized. At step 114, the traction flag is reset and at step 116 a count value in a respective timing register for each of the wheels is set equal to a constant $T_1$. In one embodiment, $T_1$ is equal to a count of 50. Following step 116, the program exits the routine and proceeds to the anti-lock brake control routine.

Returning to step 106, if the program determines the vehicle operator has not actuated the vehicle brakes, a step 118 is executed at which a slip factor value 1slip representing the slip of the right front driven wheel is determined in accord with the expression 1slip=$S_{RR}/S_{RF}$ where $S_{RR}$ and $S_{RF}$ are the speeds of the right rear and right front wheels, respectively. As can be seen, with no slip of the right front driven wheel, the value of the slip factor 1slip will be unity and as acceleration wheel slip increases, the value of the slip factor 1slip decreases. Similarly, at step 120, the value of a slip factor 2slip representing the slip of the left front driven wheel is determined in accord with the expression 2slip=$S_{LR}/S_{LF}$ where $S_{LR}$ and $S_{LF}$ are the speeds of the left rear and left front wheels.

At step 122, the program determines a ramp value 1ramp representing the rate of increase in brake pressure to be applied to the right front wheel if its acceleration slip becomes excessive. This value is determined in accord with the expression:

1ramp=$(1-(1/S_{RF}))*(1-1slip)$.

Similarly, a ramp value 2ramp representing the rate of increase in brake pressure to be applied to the left front wheel if its acceleration slip becomes excessive is determined in accord with the expression:

2ramp=$(1-(1/S_{LF}))*(1-2slip)$.

In this embodiment, the limit of slip of the driven wheels is provided only during launching of the vehicle from a standstill. This limitation is provided by step 126 where the vehicle speed represented by the speed of an undriven rear wheel or an average of the two wheels is compared to a calibration value $K_V$ above which wheel slip control during vehicle acceleration is not provided.

If the vehicle speed is greater than this calibration value, the program proceeds to a step 128 where the count in the timing registers associated with each wheel is compared to the value $T_1$ (equal to 50 in this embodiment). A count unequal to $T_1$ indicates the system has been operating in an acceleration slip control mode thereby requiring certain actions to be completed primarily relating to positioning the pistons 42 of the modulators in their fully extended positions. Assuming the time is equal to $T_1$, the program proceeds to a step 130 where the torque motors are deenergized by setting the commanded motor current $I_{MC}$ to the drivers to zero. Thereafter at step 132, the reservoir and brake valves 20, 22, 26 and 28 are deenergized.

Returning to step 126, if the vehicle speed is in the acceleration slip control speed range, the program proceeds to a step 134 where a traction ready flag is sampled. As will be described, the traction ready flag is initially reset but is set upon the retraction of the pistons 42 of the modulators 12 and 16 to fill the chamber 50 with brake fluid from the brake fluid reservoir in response to a sensed potential for excessive acceleration slip. Assuming that the traction ready flag is reset, the program proceeds to a step 136 where the value of each of the slip factors 1slip and 2slip are each compared with a threshold value $S_1$. $S_1$ lis a high value such as 0.95 below which a potential for excessive slip exists. Slip factor values equal to or greater that $S_1$ indicates no potential for excessive acceleration wheel slip Assuming both slip factors are equal to or greater than $S_1$, the program proceeds to a step 138 where the count in the timer register is compared to the value $T_1$. Assuming an initial condition where the time is equal to $T_1$, the program proceeds to a step 140 where the time is set to $T_1$ (significant in the case where the time is less than $T_1$ in step 138) and then proceeds to a step 142 where the traction flag is reset. When set, this flag indicates the program has initiated steps to control acceleration slip. In general, this occurs when one of the slip factor values becomes less than the value $S_1$.

At step 144, the program provides a motor current command value $I_{MC}$ equal to zero to each of the driver circuits 66 and 68. At the next step 146, a value of a parameter 1step associated with the right front driven wheel and the value of a parameter 2step associated with the left front driven wheel are set to zero. The function of these parameters will hereinafter be described. At step 148, the reservoir and brake valves 20, 22, 26 and 28 are deenergized. Thereafter, the program exits the interrupt routine.

The foregoing series of steps are repeated at the five millisecond interrupt interval as long as the value of either wheel slip factor 1slip or 2slip does not decrease below the value $S_1$. If either one of the slip factors 1slip or 2slip decreases below $S_1$ indicating a potential for excessive acceleration slip thereby requiring the actuators to be conditioned to be able to apply braking pressure, the program proceeds directly from step 136 to a step 150 where the count in the timer register is decremented and then to step 152 where the count is compared to zero. Since initially the time is greater than zero, the program proceeds to a step 154 where the reservoir valves 22 and 28 are both energized. This opens the fluid flow path from the brake fluid reservoir to the chambers 50 of each of the modulators 12 and 16.

At step 156, the brake computer commands the drivers 66 and 68 to apply a maximum dump current to each of the motors in the modulators 12 and 16. In this regard, the brake computer provides an enable signal to each of the drivers 66 and 68 in addition to setting the direction signal to a state for retracting the piston 42 of each of the modulators. The value of $I_{MC}$ provided to the driver circuits 66 and 68 is the maximum value to provide for maximum rate of retraction of the pistons.

At step 158, the value of the parameter 1step previously referred to in regard to step 146 is set equal to the previous value of the parameter plus a value equal to 1ramp determined at step 122 of FIG. 4. The value of 1ramp provides for an increase in the value of 1step upon repeated executions of the step 158 at a rate determined by the right front wheel slip and speed. Similarly, at step 160, the value of the parameter 2step is increased by the value of 2ramp determined at step 124 so that the value of 2step increases upon repeated executions of the step 160 at a rate determined by the slip and speed of the left front wheel.

At step 162, the traction flag previously referred to in regard to step 142 is set indicating the interrupt routine has initiated acceleration slip control operation. Thereafter, the program exits the routine.

As long as one of the wheel slip factors 1slip or 2slip is less than S1, the steps 136 and 150 thru 162 are repeated at each execution of the 5 millisecond interrupt routine until such time that the count in the timer register has been decremented to zero. The time period over which the initial count of $T_1$ is decremented to zero provides for full retraction of the piston 42 in each of the modulators 12 and 16 to the fully retracted position providing for maximum volume of the chambers 50. As the pistons are retracted, brake fluid is drawn into the expanding volume of the chambers 50. The modulators 12 and 16 at this time are in condition to apply braking pressure to an excessively slipping driven right front or left front wheel.

When step 152 determines the count in the timing register has been decremented to zero, the program proceeds to a step 164 where a traction ready flag is set to indicate that the piston 42 in each of the modulators has been retracted to draw fluid into the chambers 50 and are in condition for applying brake pressure to the respective wheel brakes. At step 166, the value of the commanded motor $I_{MC}$ for each of the modulators 12 and 16 is set equal to the respective step values 1step and 2step determined during the repeated executions of the program steps 158 and 160. The resulting values of commanded motor current are not yet provided to the driver circuits 66 and 68.

After step 166 and during subsequent executions of the interrupt routine, each of the driven wheels may be dealt with separately. At step 167, the program points to the first of the two wheels which for purposes of illustration is assumed to be the right front driven wheel. From step 167 and from step 134 during subsequent executions of the five millisecond interrupt routine, the program proceeds to a step 168 where the value of the slip factor of the wheel pointed to is compared to a value $S_2$ such as 0.90. Assuming the slip factor 1slip is greater than $S_2$, step 170 is next executed to determine an engage threshold for the right front wheel. In the preferred embodiment, the engage threshold is a speed linearized threshold varying as a function of vehicle speed. The equation for establishing the engage threshold may take the form:

$$(((vehicle\ speed - 4\ mph) \times 2.3) + 50)/100.$$

The threshold established by this expression provides for an engage threshold slip factor or 0.5 at 4 mph vehicle speed, whereas at 15 mph vehicle speed, the engage threshold is at a slip factor of 0.75. The effect is to provide for the initiation of the application of the brakes of a slipping wheel at higher values of wheel slip for lower vehicle speeds. This provides for the avoidance of false trips of the wheel slip control system at slower speeds and a quicker reaction to smaller slips at higher vehicle speeds.

At step 172, the program compares the slip factor of the selected wheel with the engage threshold calculated at step 170. If the engage threshold has not been reached, the program proceeds to a step 174 where it determines whether or not the slip factors of both wheels have been considered. If not, the program proceeds to a step 176 where the program points to the second wheel after which the routine returns to step 134. Thereafter, steps 168 through 174 are repeated for the remaining driven wheel. Upon the next execution of step 174, the program exits the 5 millisecond interrupt routine.

Returning to step 172, if it is determined that the slip factor of the wheel pointed to is less than the engage threshold indicating a value of slip requiring brake actuation to limit slip, the program proceeds to a step 178 where the reservoir valve 22 or 28 associated with the wheel pointed to by the program is deenergized to close off the brake fluid reservoir from the chamber 50 and the wheel brake cylinder. At the next step 180, the brake valve 20 or 26 associated with the selected wheel is energized to isolate the master cylinder from the corresponding modulator 12 or 16.

At step 182, the existing motor current command value $I_{MC}$ is increased by the ramp value calculated at step 120 or step 124 depending upon which wheel is currently selected by the program. It will further be recalled that the motor current command value was initially set to the step factor at program step 166 previously described. Thereafter at step 184, the motor current command value is provided to the respective driver 66 or 68. Simultaneously, the program provides an enable signal to the respective driver while setting the state of the direction signal in the state providing for extension of the piston 42 upon rotation of the torque motor 32. The driver circuit 68 controls the motor current to the commanded value as previously described with reference to FIG. 2.

As previously indicated, the torque output of the motor is related to the current through the motor thereby establishing a pressure at the front wheel brake related to the commanded motor current value. The brake torque applied to the wheel opposes the drive torque applied to the wheel through the drive train of the vehicle tending to reduce the acceleration slip of the corresponding vehicle wheel. The effect of this application on brake torque functions to transmit drive torque to the other driven wheel through the differential of the drive axle.

From step 184, the program proceeds to step 174 to determine whether or not both wheels have been considered. If not, the program proceeds to step 176 where it selects to the remaining wheel and the program repeats the foregoing steps.

As long as the wheel slip factor of the selected wheel is less than the engage threshold established at step 172, the program provides for ramping of the brake pressure at the selected wheel in order to reduce its slip rate. At any such time that the slip of the selected driven wheel is reduced by application of the brake pressure so that the slip factor increases to above the engage threshold as sensed at step 172, the program bypasses the steps 178 through 174 to hold the brake pressure previously established. The brake pressure at that wheel is held until such time that the slip factor becomes equal to or greater than the value $S_2$ established at step 168.

When the slip factor of the selected wheel becomes equal to or greater than the value $S_2$, the program proceeds from the step 168 to a step 186 where the sum of the two slip factors is compared to a calibration constant $S_3$ that may be, for example, 1.95. If the sum of the slip factors is less than $S_3$, the program proceeds to a step 188 where the count in the timing register is reset to zero. Thereafter, the program proceeds to a step 190 where the motor current command applied to each of the drivers 66 and 68 is set to a maximum value and the state of the direction signal is set to command retraction of the pistons 42. Thereafter, upon repeated executions of the 5 millisecond interrupt routine, the DC torque motors in the modulators 12 and 18 retract the pitons to terminate the application of brake pressure to the wheel brake cylinders.

When the sum of the slip factors becomes greater than $S_3$ indicating little or no potential for excessive slip to occur in either wheel, the program proceeds from the step 186 to a step 192 where the count in the timing register is compared to a calibration constant $T_2$ which may be, for example, 100. Since the count was reset at step 188 prior to the sum of the slip factors exceeding the value $S_3$, the program proceeds from step 192 to a step 194 where the count is incremented. When the count is incremented to the value $T_2$ upon repeated executions of the 5 millisecond interrupt routine, the program proceeds from the step 192 to a series of steps for extending the pistons 42 in each of the modulators 12 and 16 to condition the modulators for operation to limit the manually applied braking pressure for wheel-lock control. As previously described, this is required since the modulators would be incapable of reducing the brake pressure at the wheel cylinders when the pistons are in the retracted position.

Returning to step 192, when the count is incremented to $T_2$, the program proceeds to the step 138 where the count is compared to the value $T_1$. Since the time $T_2$ is greater than $T_1$, the program proceeds to a step 196 where the reservoir valves 22 and 28 are each energized to open the fluid line between the chambers 50 in each of the modulators 12 and 16 to the brake fluid reservoir. At step 198, the brake computer 10 commands the maximum current to the torque motors 32 and sets the direction signal in a state for rotating the motor in a direction to extend the pistons 42 to pump the fluid from the chamber 50 back into the brake fluid reservoir through the respective reservoir valve.

At step 200, the count in the timing register is decremented after which the traction and traction ready flags are reset at step 202. Thereafter, the program exits the routine. Upon the next execution of the 5 millisecond interrupt routine, the program proceeds to the step 134 where the state of the traction ready flag is sampled. Since reset at step 202, the program proceeds to the step 136 where the slip values are compared to $S_1$. Since the slip factors are now at a large value representing low wheel slip, the program again executes the series of steps 138 and 196 through 202 as previously described. This sequence of steps is repeated until such time that the timing register has been decremented to the count $T_1$ as determined at step 138. At this time, the program proceeds to execute the steps 140 through 148 wherein the time is reset to the value $T_1$, the traction flag is reset, the commanded motor current is set to zero for each of the DC torque motors, the parameters 1step and 2step are reset to zero and the reservoir and brake valves are deenergized to place the braking system in condition for manual brake application. Following step 148, the brake system has been returned to the initial condition where manual brakes are applied through the brake valve 20, the check valve 58 opened by full extension of the piston 42 and to the wheel brake cylinder. The modulators 12 and 16 are at this time ready for operation during anti-lock brake control to be retracted to reduce the brake pressure in the respective wheel brake cylinder for preventing wheel lockup.

The foregoing description of a preferred embodiment for the purpose of explaining the principles of this invention is not to be considered as limiting or restricting the invention since many modifications may be made by the exercise of skill in the art without departing from the scope of the invention.

The embodiments of the invention in which an exclusive property or privilege is claimed are defined as follows:

1. A brake pressure control system for a vehicle braking system having a wheel brake cylinder and a master cylinder operated by the vehicle operator for applying brake fluid under pressure through a brake line to the wheel brake of a driven wheel for applying braking forces to the wheel related to the pressure of the brake fluid, the system comprising in combination:

a pressure control modulator in the brake line intermediate the master cylinder and the wheel brake cylinder, the modulator including (a) a cylinder having fluid communication with the master cylinder and the wheel brake cylinder and (b) a piston in the cylinder movable away from an extended position defining a minimum volume in the cylinder to reduce the pressure of the brake fluid and away from a retracted position defining a maximum volume in the cylinder to increase the pressure of the brake fluid;

means for determining the slip condition of the driven wheel during vehicle acceleration;

means responsive to a determined wheel slip indicating a potential for excessive wheel slip for positioning the piston at the retracted position to condition the modulator for pressurizing the brake fluid to apply braking forces to the wheel;

means responsive to a determined wheel slip indicating excessive wheel slip for moving the piston from the retracted position to decrease the volume in the cylinder to pressurize the brake fluid to apply braking forces to the wheel to limit wheel slip; and means responsive to a determined wheel slip indicating an absence of a potential for excessive wheel slip for positioning the piston to the extended position to condition the modulator for limiting the pressure of the brake fluid established by operation of the master cylinder, whereby the modulator is conditioned to limit wheel slip during vehicle acceleration and to limit brake pressure during operation of the master cylinder.

2. A brake pressure control system for a vehicle braking system having a wheel brake cylinder, a wheel brake fluid reservoir and a master cylinder operated by the vehicle operator for applying brake fluid under pressure through a brake line to the wheel brake of a driven wheel for applying braking forces to the wheel related to the pressure of the brake fluid, the system comprising in combination:

a pressure control modulator in the brake line intermediate the master cylinder and the wheel brake cylinder, the modulator including (a) a cylinder having fluid communication with the master cylinder and the wheel brake cylinder and (b) a piston in the cylinder movable away from an extended position defining a minimum volume in the cylinder to reduce the pressure of the brake fluid and away from a retracted position defining a maximum volume in the cylinder to increase the pressure of the brake fluid;

means for determining the slip condition of the driven wheel during vehicle acceleration;

means responsive to a determined wheel slip indicating a potential for excessive wheel slip for positioning the piston at the retracted position to condition the modulator for pressurizing the brake fluid to apply braking forces to the wheel;

means responsive to a determined wheel slip indicating excessive wheel slip for moving the piston from the retracted position to decrease the volume in the cylinder to pressurize the brake fluid to apply braking forces to the wheel to limit wheel slip;

means responsive to a determined wheel slip indicating an absence of a potential for excessive wheel slip for positioning the piston to the extended position to condition the modulator for limiting the pressure of the brake fluid established by operation of the master cylinder; and means for establishing fluid communication between the brake fluid reservoir and the cylinder while the piston is being moved to the retracted position to fill the cylinder with brake fluid and being moved to the extended position to return brake fluid from the cylinder to the brake fluid reservoir, whereby the modulator is conditioned to limit wheel slip during vehicle acceleration and to limit brake pressure during operation of the master cylinder.

3. The system of claim 2 further including means for isolating the master cylinder from the pressure control modulator while the piston is being moved to decrease the volume in the cylinder to pressurize the brake fluid to apply braking forces to the wheel to limit wheel slip.

4. A brake pressure control system for a vehicle braking system having a wheel brake cylinder, a wheel brake fluid reservoir and a master cylinder operated by the vehicle operator for applying brake fluid under pressure through a brake line to the wheel brake of a driven wheel for applying braking forces to the wheel related to the pressure of the brake fluid, the system comprising in combination:

a pressure control modulator in the brake line intermediate the master cylinder and the wheel brake cylinder, the modulator including (a) a cylinder having fluid communication with the master cylinder and the wheel brake cylinder and (b) a piston in the cylinder movable between an extended position defining a minimum volume in the cylinder and a retracted position defining a maximum volume in the cylinder;

a reservoir fluid line coupled between the brake fluid reservoir and the brake line at a point intermediate the pressure control modulator and the wheel brake cylinder;

a normally closed valve in the reservoir fluid line, the normally closed valve isolating the brake fluid reservoir from the cylinder of the modulator and the wheel brake cylinder when the normally closed valve is closed;

means for sensing an excessive wheel slip condition of the driven wheel during vehicle acceleration;

means responsive to a sensed excessive wheel slip of the vehicle driven wheel during vehicle acceleration for (a) opening the normally closed valve in the reservoir fluid line, (b) retracting the piston to draw fluid from the fluid reservoir into the cylinder, (c) closing the normally closed valve to isolate the brake fluid reservoir from the modulator and the wheel brake cylinder, (d) moving the piston toward the extended position to reduce the volume in the cylinder to generate braking pressure at the wheel brake cylinder to limit wheel slip; and means responsive to a sensed termination in the excessive driven wheel slip during vehicle acceleration for (a) opening the normally closed valve in the reservoir fluid line and (b) fully extending the piston to return brake fluid to the brake fluid reservoir, whereby when said piston is returned to the extended position, the modulator is conditioned for operation to reduce braking pressure during a sensed incipient wheel lockup condition during application of brake pressure through the master cylinder to prevent wheel brake lockup.

5. A method of controlling the brake pressure in a vehicle braking system having a wheel brake cylinder, a wheel brake fluid reservoir, a master cylinder operated by the vehicle operator for applying brake fluid under pressure through a brake line to the wheel brake of a driven wheel for applying braking forces to the wheel related to the pressure of the brake fluid, a pressure control modulator in the brake line intermediate the master cylinder and the wheel brake cylinder, the modulator including (a) a cylinder having fluid communication with the master cylinder and the wheel brake cylinder and (b) a piston in the cylinder movable away from an extended position defining a minimum volume in the cylinder to reduce the pressure of the brake fluid and away from a retracted position defining a maximum volume in the cylinder to increase the pressure of the brake fluid, comprising the steps of:

determining the slip condition of the driven wheel during vehicle acceleration;

establishing fluid communication between the brake fluid reservoir and the cylinder and positioning the piston at the retracted position to fill the cylinder with brake fluid to condition the modulator for pressurizing the brake fluid to apply braking forces to the wheel when the determined wheel slip indicates a potential for excessive wheel slip;

isolating the brake fluid reservoir from the cylinder and moving the piston from the retracted position to decrease the volume in the cylinder to pressurize the brake fluid to apply braking forces to the wheel to limit wheel slip when the determined wheel slip represents excessive wheel slip;

establishing fluid communication between the brake fluid reservoir and the cylinder and positioning the piston to the extended position to return brake fluid to the reservoir from the cylinder to condition the modulator for limiting the pressure of the brake fluid established by operation of the master cylinder when the determined wheel slip indicates an absence of a potential for excessive wheel slip, whereby the modulator is conditioned to limit wheel slip during vehicle acceleration and to limit brake pressure during operation of the master cylinder.

* * * * *